United States Patent

[11] 3,627,134

[72] Inventor Arvel H. Mattson
W. Covina, Calif.
[21] Appl. No. 875,854
[22] Filed Nov. 12, 1969
[45] Patented Dec. 14, 1971
[73] Assignee Chemsoil Corporation
Santa Fe Springs, Calif.

[54] WATER TREATMENT DEVICE
5 Claims, 3 Drawing Figs.
[52] U.S. Cl. .................................... 210/192,
210/59, 23/278, 261/112
[51] Int. Cl. ..................................... C02b 1/18
[50] Field of Search .......................... 210/192,
198; 23/278; 261/74, 76–78, 111, 112

[56] References Cited
UNITED STATES PATENTS
1,364,716  1/1921  Clayton ........................ 23/278
3,226,201  12/1965 Harmon ....................... 23/278 X
3,314,766  4/1967  Mukherji ..................... 23/278
237,542  2/1881  Jones .......................... 261/111 X
2,385,200  9/1945  Friedel ........................ 261/76 X
2,615,700  10/1952 Dixon .......................... 261/112 X Primary Examiner—Samih N. Zaharna
Assistant Examiner—Thomas G. Wyse
Attorney—Angus & Mon ABSTRACT: Apparatus for burning sulfur under a forced air draft to produce gaseous sulfur dioxide which is then introduced into a mixing system where the sulfur dioxide is dissolved in a continuing flow of irrigation water to acidify the water. The treated water is then added to a greater flow of irrigation water to increase the effectiveness of the irrigation water in soaking into soil to greater depths and to chemically leach undesirable minerals from the soil such as salt. The sulfur is burned in a two-zoned tank having a lower burner chamber fed with metered air for combustion and an upper gas collector chamber in which the gaseous products of combustion from the lower burning chamber are mixed with additional air and from which they are piped to a mixing chamber for solution in water which is then pumped to the irrigation water.

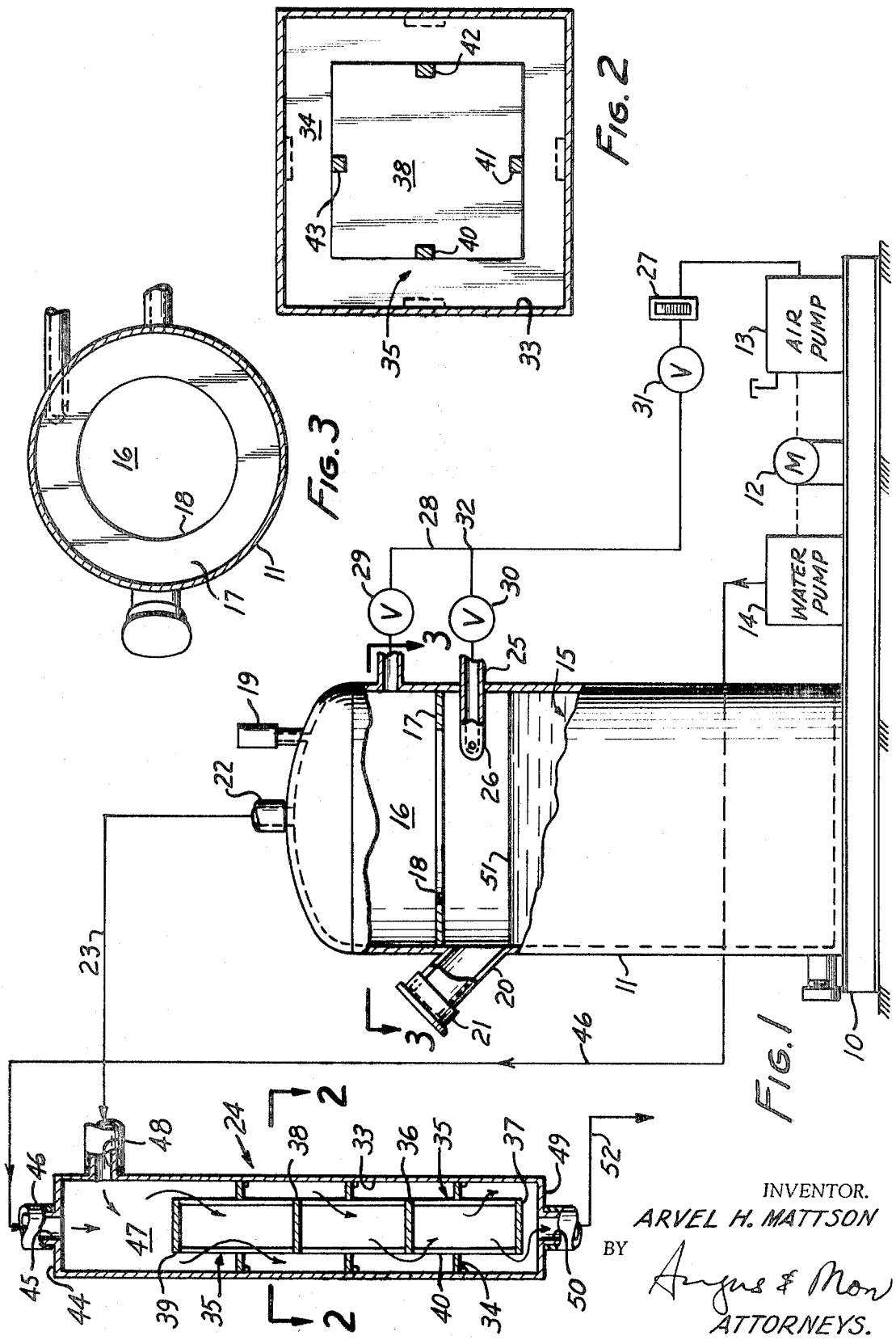

WATER TREATMENT DEVICE

This invention relates to a sulfur dioxide generating device with associated apparatus for dissolving its effluent gases in irrigation water.

An object of this invention is to provide a method of producing sulfur dioxide gas and dissolving it in water in a sealed system to minimize contamination of the atmosphere.

A further object of this invention is to provide a closed system efficiently to utilize generated sulfur dioxide gas directly with a supply of irrigation water, both in steady flow.

A further object of this invention is to provide for intimate and effective solution of the generated sulfur dioxide gas with and in the steady flow of irrigation water.

A further object of this invention is to provide closed burning and mixing system which will eliminate the entrainment of solid sulfur.

These and other objects and advantages of this invention may be seen from the study of the drawings and the description of a preferred embodiment of the invention, which follows:

FIG. 1 is a side elevation, partially in cross section, of the presently preferred embodiment of the invention;

FIG. 2 is a section taken at line 2—2 of FIG. 1; and

FIG. 3 is a section taken at line 3—3 of FIG. 1.

In the device as shown in the FIGS., a frame 10 mounts a tank 11, a motor 12, an air pump 13, and a water pump 14. The motor 12 is placed between the air pump 13 and the water pump 14 so that it drives both pumps simultaneously. Tank 11 is divided into two zones, formed as interconnected chambers: a lower burner chamber 15 and an upper gas collector chamber 16. A ring-shaped divider plate member 17 which is provided with a central hole 18 to pass the gas from chamber 15 to chamber 16 is mounted to the inside wall of the tank. Gas collector chamber 16 is provided with a safety valve 19 to relieve excess pressure of generated gas.

Tank 11 has a filler neck 20 for charging sulfur into the burner chamber 15. The filler neck 20 is provided with a closure cap 21. An outlet pipe 22 is provided with pipe connection 23 to water mixer 24. First air inlet pipe 25 is provided with an orifice 26 which limits the flow of air into the burner chamber 15 and minimizes turbulence. This substantially reduces the amount of entrained solid sulfur. The air inlet pipe 25 is connected to an airflow meter 27 and thence to the air pump 13. A second air inlet pipe 28 branches off from air inlet pipe 25 to conduct a flow of air into the gas collector chamber 16. This operates to supplement the air available for uniform burning, and is effective in reducing to negligible amounts entrained sulphur particles by making certain that there is air in the gas collector chamber to burn any sulphur particles which may have become entrained in the flow of gas from the burner chamber. This secondary combustion process occurs in the collector chamber, and solid particles therefore do not pass into the lines downstream of that chamber.

Both the first and second air inlet pipes are equipped with plug cocks 29 and 30 which may be used to adjust the flow of air. A third plug cock 31 in the main inlet line between the airflow meter 27 and the branching point 32 of the second air inlet pipe 28 may be used to control the primary flow of air. Pipe connection 23 leads from the top of the gas collector chamber to water mixer 24.

Water mixer 24 has a hollow shell 33 which has suspended inside, by ledge spacers 34, a cagelike structure 35. Cage 35 consists of a series of plates 36, 37, 38 and 39, which are held spaced apart and parallel by four rods 40, 41, 42 and 43. The whole assembly is held in place within the hollow shell 33 by the ledge spacers 34.

At the top end of the water mixer 24 there is an end closure 44 and a nipple 45. The nipple 45 can accommodate installation of a pipe to admit irrigation water into the top end of the water mixer 24. A preliminary mixing chamber 47 has a nipple 48 entering the shell 33 laterally to admit the gas from the gas collector chamber 16 of the generator. It has been found that polyvinyl chloride pipe is most effective for conducting water and gas into the water mixer 24.

At the bottom of the water mixer 24 is a second closure 49 which is provided with a nipple 50 for piping the mixture of water and gas into a stream of irrigation water or into a reservoir of irrigation water. Flow is regulated so that the proper treatment of the irrigation water can be obtained. It has also been found desirable to plastic coat the entire interior surface of the water mixer 24 and the cagelike structure 35.

In use, the process acts in the following manner: sulfur is charged into the burner section 15 up to the filler neck 20 which leaves the level of the sulfur 51 below the divider plate 17 below the orifice 26. The cap 21 is then installed on the filler neck 20 and the sulfur is ignited (or depending on how the sulphur is ignited, by first igniting it and then closing the filler neck), and air pump 13 forces air through the orifice 26 to supply oxygen for the combustion of the sulfur. Additional air is piped into the gas collector section 16 through pipe 28 to mix with the sulfur dioxide gas which passes through central hole 18 in the divider plate 17. Somewhat more than the stoichiometric quantity of air is provided to assure complete burning of the sulfur.

The mixture of added air and products of the combustion of the sulfur leaves the collector section 16 through pipe 22 and pipe connection 23 and is conducted through pipe 52 and nipple 48 into the preliminary mixing chamber 47 of the water mixer 24.

Simultaneously, water enters the preliminary mixing chamber 47 through nipple 45 and the flow of water picks up the gas and moves turbulently through the plates of cagelike structure 35 to mix the sulfur dioxide gas intimately with the water forming a weak solution comprising mostly $H_2SO_4$, $H_2SO_3$, and dissolved $SO_2$. The resultant acidic solution exits from water mixer 24 through outlet pipe 52 and nipple 50 and is introduced into the main stream of irrigation water at a regulated rate, or into a reservoir of irrigation water to condition it for use. Water pump 14 is used to force the water through the water mixer 24 and may be operated by the same motor 12 that runs the air pump 13, and is a shunt from the mainstream. Additionally, thermometers, flow meters and valves may be inserted into the various pipelines when required, to determine the properties of the sulfur dioxide gas and the mixtures being piped.

This device is intended principally as farm equipment. Accordingly it is rugged and its controls are simple. Nevertheless a rather sophisticated result is necessary. Neither elemental sulfur nor free $SO_2$ can be discharged to the atmosphere. The two-zone combustion tank, the rugged flow meter on the air supply, and the adjustable rate of waterflow through the mixer, are all readily adjustable to seek and obtain a good equilibrium. The device requires little if any adjustment once it is set, because in the cylindrical tank, the burning area is sensibly constant, as are the flow rates of water and air.

The acidified water regularly penetrates some tightly packed soils to depths of 3 feet where untreated water penetrates only 6 inches.

I claim:

1. Apparatus for treating irrigation water with gaseous products resulting from the burning of sulfur which comprises:
   a tank;
   a divider plate, said divider plate separating the interior of said tank into a lower burner chamber and an upper gas collector chamber, said divider plate having a passage therethrough to permit the movement of gases from said lower burner chamber to said upper collector chamber;
   filler neck means, said filler neck means adapted to permit the filling of said lower combustion chamber with sulfur;
   closure means to seal said filler neck means;
   first air inlet means to admit air between said divider plate and said sulfur in said lower combustion chamber;
   second air inlet means to admit air to said upper gas collection chamber;
   means including an air pump means connected to said first and said second air inlet means to pump air into said burner chamber through said first air inlet means and through said second air inlet means;

means including a water-mixing means having a water inlet and connected to said upper gas collector chamber to receive a flow of water and to mix said flow of water with a flow of gaseous products from said upper gas collector chamber, said water mixing means adapted to discharge said mixture of gaseous products and water into a supply of water for treatment, and said water mixing means comprising a linear conduit having an axial direction of flow and a lateral dimension, and axially spaced-apart barriers alternately occluding the central portion of said lateral dimension and leaving a circumferential aperture, and occluding a circumferential portion of said lateral dimension and leaving a central aperture, whereby to increase the path length of flow from end to end of the water mixing means, and to render the flow nonlinear and turbulent.

2. Apparatus according to claim 1 which includes restrictive orifice means at the first air inlet means to said lower combustion chamber.

3. Apparatus according to claim 1 which includes plug cock means between said air pump means and said first and second air inlet means to regulate the flow of air independently to each of said first and second air inlet means.

4. Apparatus according to claim 1 which includes water pump means connected to said water-mixing means to pump a flow of water through said water-mixing means.

5. Apparatus according to claim 1 in which the conduit is prismatic, with a plurality of rods extending from end to end thereof, one set of barriers comprising plates supported inside the rods, and the other set of barriers comprising plates supported outside the rods.

* * * * *